May 16, 1961  I. ERLICHMAN  2,984,165
PHOTORESPONSIVE EXPOSURE CONTROL MECHANISM
Filed April 21, 1958  2 Sheets-Sheet 1

INVENTOR.
Irving Erlichman
BY
Brownard Mikuella
Attorneys

May 16, 1961 I. ERLICHMAN 2,984,165
PHOTORESPONSIVE EXPOSURE CONTROL MECHANISM
Filed April 21, 1958 2 Sheets-Sheet 2

INVENTOR.
Irving Erlichman
BY Brouward Mikulka
Attorneys

United States Patent Office 2,984,165
Patented May 16, 1961

2,984,165

PHOTORESPONSIVE EXPOSURE CONTROL MECHANISM

Irving Erlichman, Natick, Mass., assignor to Polaroid Corporation, Cambridge, Mass., a corporation of Delaware Filed Apr. 21, 1958, Ser. No. 729,728

29 Claims. (Cl. 95—10)

This invention relates to photographic devices and particularly to photo-responsive exposure control mechanisms.

The invention comprehends a photo-responsive exposure control mechanism comprising means defining an aperture, photosensitive means for producing electrical signals in accordance with light incident thereon and a shutter means which includes a movable first member having a configuration, said configuration controlling exposure through said aperture during movement of said first member, and a movable second member mounted on said first member for movement therewith and for movement relative to said first member for varying said configuration in accordance with said electrical signals to change said exposure.

Another object is to provide a photo-responsive exposure control mechanism comprising means defining an aperture, photosensitive means for producing electrical signals in accordance with light incident thereon, a shutter member mounted in covering relation to said aperture and having an opening therein, said opening being movable across said aperture to produce an exposure, said exposure being a function of the dimension of said opening in the direction of said movement, means coupled with said photosensitive means and for translating said signals into mechanical displacements, said means for translating being mounted upon said shutter member for movement therewith, a movable second member mounted upon said means for translating for movement therewith and for movement relative to said shutter member for altering said dimension of said opening in accordance with said signals to vary said exposure.

Still another object is to provide a photo-responsive exposure control mechanism comprising, in combination, a housing means having an exposure opening therein, a photovoltaic means for producing electrical signals in accordance with light intensities of the field of view of said aperture, a circular shutter blade rotatably mounted upon said housing in covering relation to said aperture, said blade having an arcuate slot therein adjacent the periphery thereof, said slot being movable across said aperture to produce an exposure, said exposure being a function of the length of said slot, means for rotating said blade, galvanometer means coupled with said photovoltaic means and being attached to said blade for rotary movement therewith, a diaphragm blade attached to said galvanometer means and lying parallel with said shutter blade, said diaphragm blade being movable with said shutter blade and movable relative to said shutter blade by rotation of said galvanometer means for altering the length of said arcuate slot in accordance with said electrical signals to vary said exposure.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention reference should be had to the following detailed description taken in connection with the accompanying drawings wherein.

The automatic exposure control mechanism of the general form comprehended by the invention is relatively simple in construction, possessing a minimum of moving parts in a highly compact form. The mechanism as shown will be seen to have distinct advantages whereby the total exposure through said mechanism may be photoelectrically controlled over a fairly wide range of exposure values. The exposure period is determined by the configuration of the opening made coincident with the exposure aperture of the photographic device through which the shutter rotates. The shutter is adapted to incorporation with any of a variety of conventional cameras but is shown in a preferred embodiment as a "between-the-lens" type of shutter for cameras employing lenses of relatively small apertures which are adapted to exposure of film having a "fast" emulsion. "Total exposure," as referred to herein, is to be regarded as being a function of both the exposure interval during which light passes through the lens aperture and of the total cross-sectional area presented by the combination of the exposure aperture and the effective blade opening during said interval. The effective blade opening will be understood to mean that configuration of the blade, as modified by an adjustable diaphragm member, which controls the area through which light passes to produce an exposure during said interval.

Figure 1:
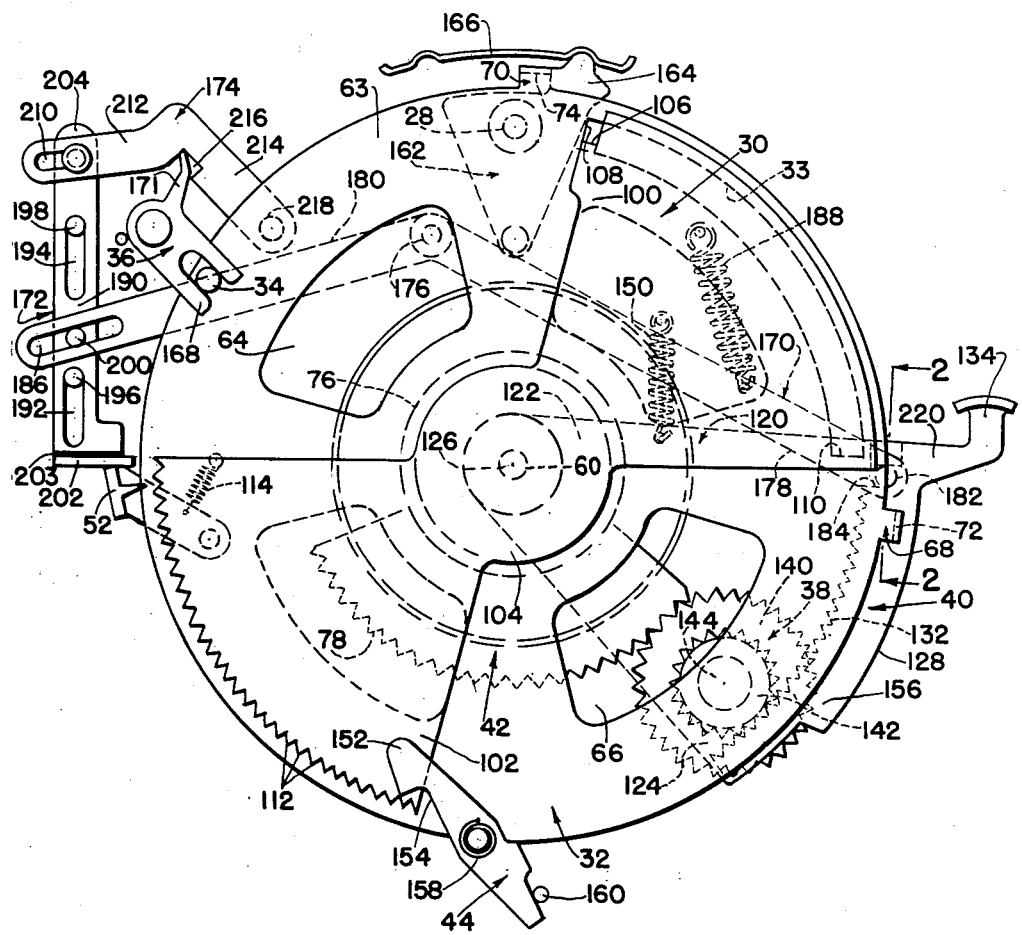
Figure 1 is a diagrammatic plan view showing the parts of the mechanism in a rest position.
Figure 3:
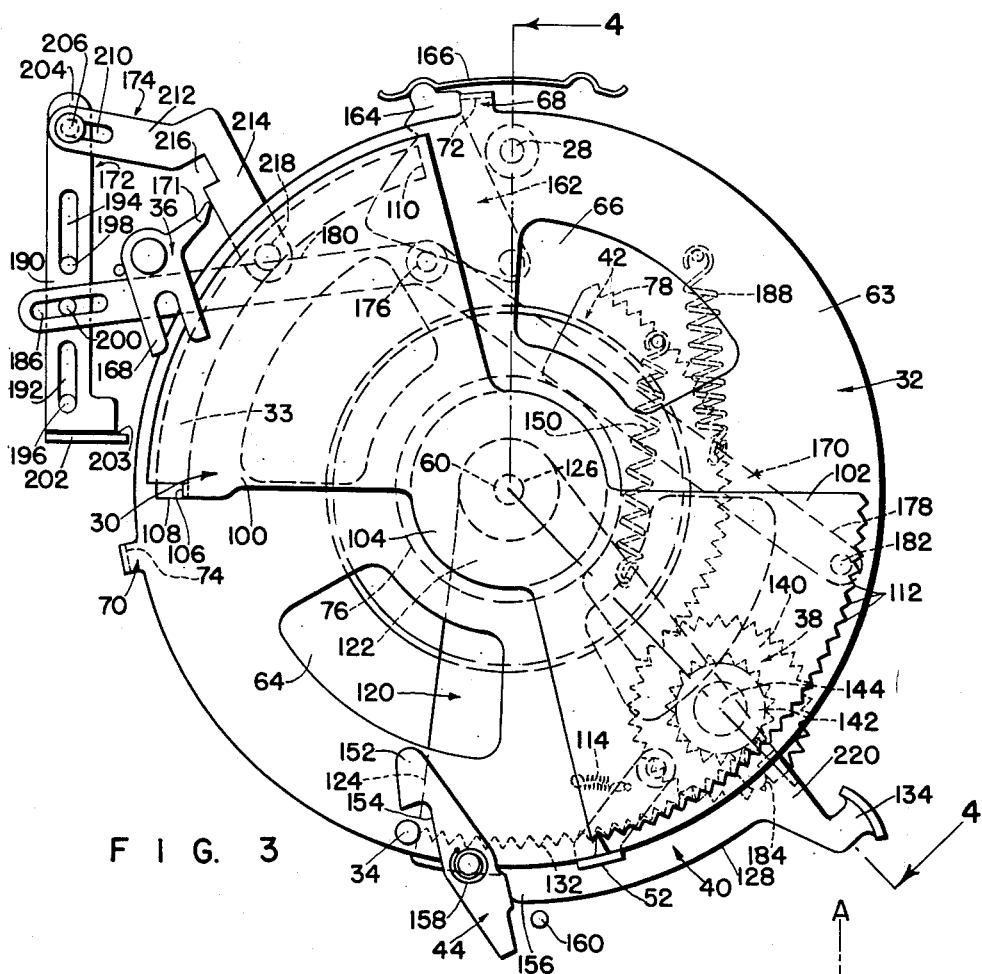
Fig. 3 is a diagrammatic plan view of the mechanism of Figure 1 generally in a set position.
Figure 4:
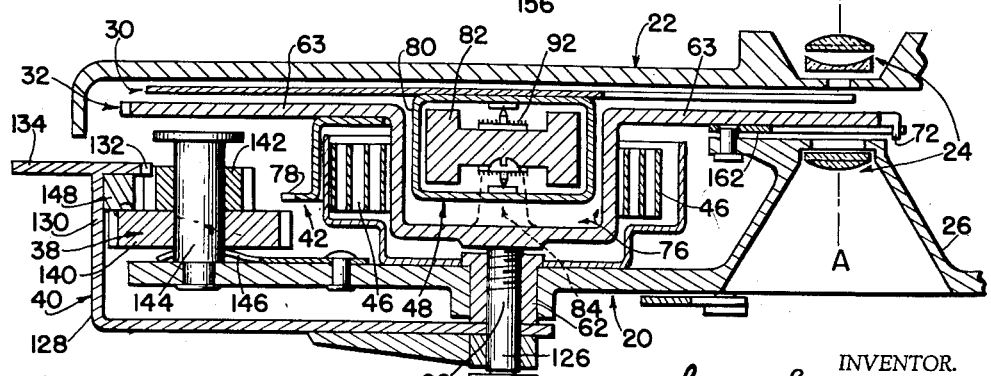
Fig. 4 is a cross-sectional view taken along line 4—4 of Fig. 3.

Referring now to the various drawings, wherein like numerals denote like parts, the preferred constructional features of the present invention will be apparent. Referring particularly to Figs. 1, 3 and 4, the automatic exposure control mechanism includes a rear housing portion 20 and a front housing portion 22 both shown in fragment, these two housings having suitably mounted therebetween a camera lens system designated generally at 24, a portion 26 of the rear housing also providing an exposure aperture 28 which is disposed coaxially with the optic axis A—A of said lens system. Positioned between the exposure aperture and a portion of the lens system is a diaphragm blade 30 and a shutter blade 32, pivotally mounted on rear housing portion 20 in covering relation to aperture 28 and movable in a plane normal to axis A—A. Blade 32 is provided with an opening 33 therein. A first latching means comprising, for instance, pin 34 and first latch 36 is provided for releasably retaining said shutter blade in said covering relation.

As a means for rotating the shutter blade in a counterclockwise direction, there is shown a gear means 38 cooperating with an actuating means 40, which gear means is adapted to mesh releasably with a gear segment 42 attached to shutter blade 32 for rotating shutter blade 32 to a set position as shown in Fig. 3.

As a means for latching the shutter blade in the set position, there is provided a second latching means comprising, for instance, second latch 44 and pin 34. As a means for rotating shutter blade 32 clockwise, there is shown, as in Fig. 4, resilient means such as main spring 46. Mounted coaxially with the shutter blade is galvanometer element 48 which is electrically coupled with a photosensitive means 50 as shown in the circuit diagram of Fig. 5. The photosensitive means 50 may comprise any of the photovoltaic cells, well known to the art, which are characterized by generating electrical signals in accordance with the intensity of light incident thereon, such a photovoltaic cell being preferably so mounted on front housing portion 22 as to have the photosensitive surface of the cell disposed normally to optic axis A—A. Mounted upon the galvanometer element and rotatable therewith relative to and in a plane parallel and adjacent to the plane of movement of shutter blade 32 is diaphragm blade 30. A means such as pawl 52 is provided for locking diaphragm blade 30 relative to the shutter blade 32.

A brief description of the operation of the mechanism described above will be helpful in an understanding of the detailed disclosure of the various elements to follow. In the operation of the above-described embodiment of the invention, galvanometer element 48 rotates diaphragm blade 30 relative to shutter blade 32 and responsively to signals from photosensitive means 50 to vary the length of an opening in shutter blade 32 before exposure. Movement of actuating means 40, in a clockwise direction, rotates gear means 38 which is in engagement with and therefore rotates gear segment 42. With rotation of the gear segment, shutter blade 32 rotates in a counter-clockwise direction into set position wherein pin 34 engages second latch 44. The movement of actuating means 40 releases pawl 52 for engaging and locking diaphragm blade 30 into a fixed relation to shutter blade 32 so that the diaphragm blade is rotatable in fixed relation with the shutter blade. Continued movement of actuating means 40 in the same direction then releases second latch 44 from pin 34, allowing the shutter blade to rotate rapidly, preferably at a substantially constant speed, in a clockwise direction under the bias of spring 46. Rotation of the shutter blade in this direction uncovers exposure aperture 28 by movement of opening 33 in the shutter blade across the aperture, the exposure effected thereby being a function of the dimension of the opening in the direction of said movement. This rotation of shutter blade 32 continues until pin 34 strikes first latch 36 and is restrained thereby, the shutter blade then being in the rest position.

Referring now more specifically to the construction of shutter blade 32, it may be seen that the preferred modification thereof includes a thin shutter blade which is preferably constructed of an opaque lightweight material such as aluminum or thin sheet steel. Blade 32 is balanced for rotation about shutter blade axle 60. As seen in Fig. 4, the axle is carried in rear housing 20 in a sleeve bearing 62 channeled into the rear housing. Shutter blade 32 preferably comprises a planar circular ring 63 having a continuous periphery, portions of said ring being eliminated, as at 64 and 66, to provide lightness of weight, to minimize inertia and to provide proper dynamic balance. Adjacent the periphery of ring 63 is an opening such as arcuate slot 33, said slot having an arcuate length of less than the maximum excursion of shutter blade 32 between a rest position wherein said slot lies to one side of aperture 28 and a set position wherein the slot lies to an opposite side of the aperture. In both of said positions, the opaque portion of the periphery of ring 63 occludes aperture 28. It should be noted that in the form shown, slot 33 is provided with a width somewhat greater than the diameter of aperture 28 throughout its entire length. However, slot 33 may alternatively be provided with a continuously decreasing or increasing width throughout its arcuate length to provide for a greater range of exposures.

Disposed on the periphery of the shutter ring adjacent, respectively, each extremity of slot 33 are projections such as tabs 67 and 70, respective portions 72 and 74 of each of said tabs protruding perpendicularly to the plane of shutter ring 63. As a means for limiting the rotational excursion, ring 63 is also provided at a peripheral portion thereof with a stop member such as pin 34 which protrudes normally from the surface of the ring. The central portion of blade 32, i.e., the area about the pivotal axis thereof, is provided with a dished-out portion such as cylindrical well 76, said well being so dimensioned that a desired galvanometer element may be inserted therein. Disposed about the external walls of well 76 is a resilient means, such as helical main spring 46, for rotating blade 32 in a clockwise direction to produce an exposure by movement of slot 33, or a portion thereof, across aperture 28. One extremity of main spring 46 is preferably attached to rear housing portion 20, the other extremity of the main spring being attached to a circumferential portion of said well. In the form shown, a means rotating the shutter blade in a counter-clockwise direction comprises an arcuate gear segment 42 attached to shutter blade 32 adjacent a side of well 76, said gear segment having gear teeth 78 extending radially outward with respect to the pivotal axis of shutter blade 32 and in a plane parallel to the plane of rotation of said shutter blade.

As a means for translating the electrical signals from photocell 50 into mechanical displacements there is provided an electromagnetic element such as galvanometer 48, which may be, but is not necessarily limited to, any of the D'Arsonval type galvanometers well known to the art. In the preferred embodiment, as shown in Fig. 4, galvanometer 48 is comprised of moving coil 80 arranged peripherally about permanent magnet 82, coil 80 being pivotally mounted on said magnet inside well 76 of shutter blade 32 and coaxially disposed with respect to axle 60. It is desirable that coil 80 be electrically insulated from both well 76 and magnet 82. Magnet 82 is rigidly attached to shutter blade 32 inside well 76 by mounting means designated generally at 84. Coil 80 is so dimensioned as to be freely rotatable within said well, said coil extending from said well normal to and slightly beyond the plane of shutter ring 63. Galvanometer 48 is electrically coupled with photocell 50 so that signals from the photocell may be introduced into moving coil 80 to rotate the coil in the plane of the shutter ring, the galvanometer circuit thus formed being shown in Fig. 5. One lead 86 from galvanometer 48 is attached to switching means indicated generally at 88, and the other lead 90 to photocell 50 so that signals from the photocell may be introduced into coil 80 only when blade 32 is in a rest position, the switching means being so adapted that rotation of blade 32 from the rest position opens the circuit. It should be noted that galvanometer 48 is provided, as shown in Fig. 4, with means such as hairspring 92 for biasing coil 80 in a counterclockwise direction so that coil 80 may thereby assume an equilibrium position representing the opposed forces applied to the coil by the photocell current and the bias of the hairspring.

As the exposure time through aperture 28 is a function of the arcuate length of slot 33 of shutter blade 32, the rotational speed of the shutter blade from the set position to rest position being constant, there is provided a means for varying the effective length of said slot responsively to the electrical signals from photocell 50. Such a means is provided by a covering element such as diaphragm blade 30 which is fixedly mounted on coil 80 and electrically insulated from blade 32 and being rotatable with coil 80 in a plane parallel to and adjacent the plane of rotation of shutter blade 32. Diaphragm blade 30 comprises a counterbalanced planar member disposed for rotation coaxially with the plane of shutter blade 32, diaphragm blade 30 being preferably shaped in arcuate sectors such as covering sector 100 and second sector 102 which are preferably joined at the center of curvatures thereof by a circular portion 104, the radius of each of said arcuate sectors being within the limits determined by the radius of the outer periphery of shutter ring 63 and the radius of the outer edge of slot 33 in blade 32. The length of arc of the periphery of each of said sectors is preferably equal to or slightly larger than the total length of the arc of slot 33 in shutter blade 32. Disposed on covering sector 100 is a means such as tab 106 for limiting independent arcuate movement of diaphragm blade 30 with respect to shutter blade 32. Tab 106 extends perpendicularly to the plane of said sector and is disposed to so extend into slot 33 in shutter blade 32 that engagement of tab 106 with marginal portion 108 of slot 33 restrains diaphragm blade 30 from counterclockwise movement with respect to shutter blade 32, thereby establishing a minimal effective blade opening. It should be noted that the extension of tab 106 from sector 100 in the plane thereof may be altered to increase or decrease said minimal effective blade opening. Tab 106, when in engagement with opposite marginal portion 110 of slot 33, establishes the maximum effective blade opening through slot 33, movement of diaphragm blade 30 in a clockwise direction being limited by this engagement. As a means for releasably retaining the diaphragm blade for rotation in a substantially fixed relationship with shutter blade 32, there are provided means comprising, in the preferred embodiment, a series of serrations such as teeth 112 disposed along the peripheral edge of second sector 102 and a releasable engaging member such as pawl 52. Because it is intended that pawl 52 comprise a portion of an electrical circuit, it is desirable that the pawl be composed of an electrically conducting substance such as steel or copper alloy and that pawl 52 be electrically grounded through shutter blade 32 to rear housing portion 20. Pawl 52 is pivotally mounted on shutter blade 32 and is normally urged into a position of engagement with teeth 112 by resilient means such as spring 114. It being desirable to provide a diaphragm blade having a minimum of inertia, diaphragm blade 30 is preferably manufactured of a lightweight metal, such as aluminum or magnesium, having sufficient rigidity to maintain its substantially planar configuration.

As a means for actuating the mechanism hereinbefore disclosed, there is provided an actuating element 40 which, in the form shown, comprises a substantially flat triangular portion 120 having a narrow extremity 122 and a wide extremity 124, element 40 being pivotally mounted on rear housing 20 between the rear housing and shutter blade 32 by pivot means 126 disposed at narrow extremity 122. Pivot means 126 is preferably located coaxially with the pivotal axis of shutter blade 32. Wide extremity 124 is preferably provided with an arcuate edge 128, the center of curvature of said edge being located, for instance, at pivot means 126. Element 40 is also provided, as shown in Fig. 4, with upstanding portion 130 disposed parallel with edge 128 and extending perpendicularly therefrom in the direction of shutter blade 32. Forming part of said upstanding portion are gear teeth 132 so disposed thereon as to extend radially inward toward the pivotal axis of element 40. Attached to and extending radially outward from upstanding portion 130 is arm portion 134 adapted to be moved by an operator of the mechanism for rotating element 40 about the pivot means from a normal position to a displaced position.

For transmitting the rotation of element 40 for rotating shutter blade 32 in a counterclockwise direction there is provided a means such as a gear train which comprises gear member 38 for cooperating with both the actuating element and the shutter blade. Gear member 38 comprises first rotary gear portion 140 and second rotary gear portion 142, both gear portions being coaxially attached to one another for rotation in parallel planes and being of unequal diameter; for example, in the form shown, first rotary gear portion 140 has a substantially greater diameter than second rotary gear portion 142. Gear member 38 is rotatably mounted on rear housing 20 by means such as spindle 144, member 38 being axially movable along said spindle. Second rotary gear portion 142 is in releasable meshing engagement with gear teeth 132 of actuating element 40, and first rotary gear portion 140 is in releasable meshing engagement with gear segment 42 attached to shutter blade 32.

As a means for maintaining gear member 38 in mesh with both gear teeth 132 and gear segment 42, there is provided a resilient means such as spring 146 which is disposed between rear housing portion 20 and gear member 38 for urging the gear member axially along spindle 144 and into meshing engagement with the gear teeth and gear segment. Additionally, first rotary gear portion 140 is in sliding engagement with upstanding portion 130 of actuating element 40, portion 130 comprising a cam 148 such that rotation of actuating element 40 in a clockwise direction so cams first rotary gear portion 140 against the bias of spring 146 as to move gear member 38 axially along spindle 144 for disengaging the gear member from both gear teeth 132 and gear segment 42 at a predetermined position of the actuating element. It is, however, preferable that cam 148 be so constructed for moving gear member 38 that only first rotary gear portion 140 disengages from gear segment 42, second rotary gear portion 142 remaining in mesh with gear teeth 132, gear member 38 thereby providing a speed governing means to retard return movement of element 40. As a means for normally urging element 40 for return movement in a counterclockwise direction, there is provided a resilient means such as spring 150 which is attached at its extremities respectively to rear housing portion 20 and to element 40.

For releasably latching shutter blade 32 in a set position, there is preferably provided a means such as second latch element 44 which is so pivotally mounted on rear housing portion 20 that latch portion 152 of said second latch is in engagement with pin 34 mounted on shutter blade 32 when the shutter blade is in said set position. Second latch 44 is provided with an engagement surface 154 thereon, said surface being so disposed in the arcuate path of actuating element 40 that engagement surface 154 is adapted to be contacted by striking portion 156 of actuating element 40 to impart a rotary movement to the second latch in a clockwise direction. Second latch 44 is also provided with means such as spring 158 for normally urging latch 44 in a counterclockwise direction. As a means for limiting the pivotal movement of second latch 44 in a counterclockwise direction, there is provided means such as stop pin 160 mounted on rear housing portion 20.

It being intended that an exposure be produced by movement of the effective blade opening comprising the combination of slot 33 and diaphragm blade 30 across aperture 28 during only the clockwise rotation of shutter blade 32, it is therefore necessary to provide means for occluding aperture 28 during that portion of the counterclockwise rotation of shutter blade 32 in which the effective blade opening traverses the exposure aperture. Such a means is provided, for example, by cover blind 162 which comprises a triangular planar member mounted on rear housing portion 20 at one apex of said member for pivotal movement in a plane parallel to the plane of rotation of shutter blade 32 between a covering and an uncovering position relative to exposure aperture 28, cover blind 162 being normally in a covering position when said shutter blade is in a rest position.

As a means for moving cover blind 162 between said covering and uncovering positions, there is provided, for example, cover blind extension 164 which extends radially outward from the pivotal axis of and in the plane of cover blind 162 and which so projects parallel to the plane of rotation of the cover blind as to intersect the arcuate path of movement of portions 72 and 74 of both tab 68 and tab 70, respectively, such that said extension is engageable by the tabs. For releasably retaining cover blind 162 in said covering and uncovering positions, there is provided a detent means, such as leaf spring 166, which is mounted on rear housing portion 20.

For latching shutter blade 32 in a rest position, there is preferably provided a means such as first latch element 36 which is so pivotally mounted on rear housing portion 20 that a portion of said first latch, such as fork 168, is in engagement with pin 34 mounted on shutter blade 32 when the shutter blade is in said rest position. As a means for locking first latch element 36 so as to firmly retain pin 34 in engagement with fork 168, there is provided a means such as resilient arm 171 extending radially from the pivotal axis of the second latch means and at an angle to fork 168.

As a means for synchronously actuating switching means 88, the means for releasably retaining diaphragm blade for rotation, and the first latch means 36 altogether with the movement of actuating element 40, there is preferably provided a linkage which, in the form shown, comprises a crank member 170, reciprocating link 172 and rocker arm 174. Crank member 170 is pivotally mounted on rear housing portion 20 between said rear housing portion and shutter blade 32 by means such as pivot 176. Crank member 170 comprises two arms 178 and 180 disposed at an angle to one another with pivot 176 preferably disposed at the juncture of said arms. Arm 178 of crank member 170 is provided with a linking member such as stud 182, the stud being normally in engagement with slot 184 in actuating element 40. The other arm 180 of crank 170 is provided with a linking means such as guide slot 186. Pivot 176 is disposed on said rear housing portion at a position substantially displaced from the pivotal axis of shutter blade 32 such that the arc locus of rotation of stud 182 on arm 178 is so disposed angularly to the arc of rotation of slot 184 in actuating element 40 that upon clockwise rotation of the actuating element through a predetermined angle, stud 182 may disengage from said slot. As a means for urging member 170 for counterclockwise rotation about pivot 176 there is provided a resilient element such as spring 188 which is anchored to rear housing portion 20.

Reciprocating link 172 comprises a longitudinal member 190 preferably having at least two longitudinal slots 192 and 194 disposed therein. The reciprocating link is mounted on said rear housing for slidable movement relative thereto by means such as stud 196 and stud 198 which extend respectively into slot 192 and slot 194. Arm 180 of crank member 170 is pivotally attached to reciprocating link 172 by pivot pin 200 which is attached to link 172, for example, between slot 192 and slot 194, pin 200 being so constructed as to be freely slidable along guide slot 186. Disposed at one extremity of reciprocating link 172 is contact portion 202 which is so disposed in the arcuate path of movement of pawl 52 that when shutter blade 32 is in the rest position, the contact member is in engagement with pawl 52 so as to hold the pawl in a rotated position and out of engagement with gear teeth 132 of diaphragm 30. It should be noted that contact portion 202 is preferably constructed of an electrically conducting material such as steel, copper, bronze alloy or the like and is preferably provided with means indicated generally at 203, for insulating portion 202 from the longitudinal portion of reciprocating link 172, thereby comprising a portion of switching means 88. The other extremity 204 of reciprocating link 172 is preferably pivotally attached to rocker arm 174, by means such as pivot 206 which is attached to link 172 and protrudes into channel slot 210 in rocker arm 174.

Rocker arm 174 preferably comprises an angular member having two portions 212 and 214 disposed at an angle to one another, rocker arm 174 having a keyway 216 shaped therein and being disposed adjacent the juncture of said portions, keyway 216 being adapted to releasably engage arm 171 of first latch means 36. The extremity of portion 212 is pivotally attached to the other extremity 204 of reciprocating link 172. The extremity of the other portion 214 of rocker arm 174 is pivotally attached as at 218 to housing 20 such that movement of reciprocating link 172 relative to housing portion 20 along slots 192 and 194 may rotate rocker arm 174 about pivot 206 and pivot 214 such that rocker arm 174 may disengage from arm 171 of first latch means 36. It should be noted that other means for synchronizing the operation of the switching means 88, first latching means 36 and pawl 52 may be used, for instance, the aforesaid elements may be actuated electrically by means such as solenoids or by a different system of mechanical linkages.

Figure 5:
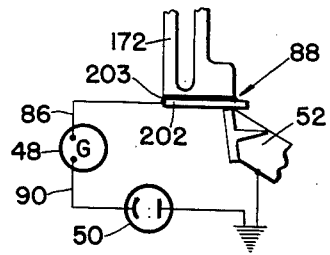
Fig. 5 is a schematic view of a switching circuit of the embodiment shown in Figs. 1–4.

The mechanism heretofore described operates as follows: light incident upon photocell 50 produces electrical signals which are proportional to the light intensity. The electrical signals are led through coil 80 which is in the circuit comprising pawl 52 and contact portion 202 of reciprocating link 172 as shown in Fig. 5. Galvanometer coil 80 in response to said signals rotates to a position of equilibrium in accordance with the magnitude of the signals, and, in thus rotating, so rotates diaphragm blade 30 relative to shutter blade 32 that the effective length of slot 33 is varied accordingly. It is to be understood that photocell 50 may be provided with a means, such as a translucent cover, for limiting the intensity of light incident thereon in order to widen the range of intensities to which the photocell may be responsive. Additionally, other means, such as an externally operable switch, may be installed in the photocell circuit for preventing a flow of current through coil 80 during periods when the mechanism is not to be used by an operator.

The mechanism may be actuated by pressure exerted by an operator upon element 40 to rotate the element in a clockwise direction from its position of rest. Such rotation of the actuating element will rotate crank member 170 about its pivotal axis, thus actuating the linkage. The rotation of the crank member 170 slides reciprocating link 172 along pins 196 and 198 in a direction away from pawl 52, allowing the pawl to rotate clockwise under the bias of spring 114 for engaging gear teeth 112 of diaphragm blade 30, thereby locking the diaphragm blade in a fixed position relative to shutter blade 32 and opening the galvanometer circuit. Additionally, the sliding movement of link 172 away from pawl 52 also rotates rocker arm 174 about its pivots and the rotation of the rocker arm releases arm 171 of first latch means 36, thereby freeing the first latch means for rotation. After element 40 has been rotated clockwise through a predetermined angle, stud 182 on crank member 170 disengages from slot 184 in element 40, thereby permitting member 170 to return under the bias of spring 188 to a rest position. It should be noted that crank member 170 is shown in Fig. 3 in the position at which said member is released and before returning to the rest position. Continued rotation of actuating element 40 in the clockwise direction rotates shutter blade 32 in a counterclockwise direction against the bias of spring 46, so moving pin 34 that first latch means 36 is rotated to free pin 34 through the opening in fork 168. The continued rotation of the actuating element rotates the shutter blade through the engagement of gear teeth 132 with gear member 38 which is in engagement with gear segment 42 attached to the shutter blade, the rotation continuing with clockwise movement of element 40 until pin 34 is engaged by second latch means 44. At a predetermined angle of the counterclockwise rotation of shutter blade 32 prior to the engagement of pin 34 by the second latch means, tab 68 on shutter blade 32 engages cover blind extension 164 and rotates cover blind 162 from covering position to uncovering position wherein the cover blind is releasably retained by spring 166. Continued rotation of actuating element 40 in a clockwise direction rotates upstanding portion 130 of the actuating element such that cam 148 engages gear member 38, forcing gear member 38 axially along spindle 144 away from shutter blade 32, gear member 38 disengaging thereby from gear segment 42. At the termination of the clockwise rotation of actuating element 40, the element strikes second latch means 44, rotating the second latch means against the bias of spring 158 and so releasing pin 34 that shutter blade 32 is free of all restraint. As shutter blade 32 has been rotated counterclockwise against the bias of spring 46, thus tensioning said spring, and as pin 34 is freed of the restraint of second latch means 44, blade 32 then rotates rapidly in a clockwise direction under the urging of spring 46, the passage of slot 33 over exposure aperture 28 effecting an exposure. As blade 32 rotates in a clockwise direction, tab 70 so engages cover blind extension 164 after exposure as to move cover blind 162 to a covering position wherein the cover blind is releasably retained by spring 166. The clockwise rotation of blade 32 continues until pin 34 engages and rotates first latch means 36 so that arm 171 of the first latch means then engages and is locked by keyway 216 of rocker arm 174. At approximately the same time, pawl 52 is engaged and rotated by contact 202, thereby renewing the galvanometer circuit and releasing pawl 52 from engagement with teeth 112 of diaphragm blade 30 so that the diaphragm blade is free for rotation relative to shutter blade 32.

Figure 2:
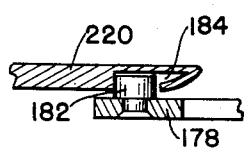
Fig. 2 is a cross-sectional view taken along line 2—2 of Figure 1.

Release of pressure by the operator upon actuating element 40 allows the actuating element to return to its initial position under the bias of spring 188. The return movement of actuating element 40 moves cam 148 so that gear member 38 is released and moves axially along spindle 144 under the urging of spring 146 to reengage gear segment 78. It is desirable that spring 188 have substantially less tension than spring 150 so that the clockwise rotation of shutter blade 32 has been substantially completed before actuating element 40 may be moved to allow the reengagement of gear member 38 with gear segment 42. As actuating element 40 returns to its initial position, extremity 220 of actuating element 40 springingly engages stud 182 on crank member 170 so that stud 182 is returned to slot 184 in actuating element 40 as shown in Fig. 2.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. An automatic exposure control mechanism for photographic devices comprising, in combination, means for defining an exposure aperture, photosensitive means for producing electrical signals in accordance with light incident thereon, and shutter means including a first member mounted for movement across said aperture and having a configuration for controlling exposure through said aperture during said movement, motor means mounted on said first member and having a portion thereof movable responsively to said signals, and a second member mounted on said portion of said motor means for movement with said first member and for movement with said portion relative to said first member for so cooperating with said configuration as to alter said exposure proportionately to said signals.

2. An automatic exposure control mechanism for photographic devices comprising, in combination, housing means for defining an exposure aperture, photosensitive means for producing electrical signals in accordance with light incident thereon, and shutter means comprising a movable shutter blade having an opening therein, said blade being movable between a first position wherein said opening lies to one side of said aperture and a second position wherein said opening lies to an opposite side of said aperture, means mounted on said shutter blade for movement therewith and having a portion movable responsively to said signals, and a diaphragm member mounted on said portion for movement therewith and for movement relative to said blade for cooperating with said opening responsively and proportionately to said signals to alter the exposure through said opening.

3. An automatic exposure control mechanism for photographic devices comprising, in combination, housing means for defining an exposure aperture, photosensitive means for producing electrical signals in accordance with light incident thereon, and shutter means comprising a shutter blade having an aperture-covering portion, said portion having an opening therein, said blade being mounted adjacent said aperture for pivotal movement between a first position wherein said opening lies to one side of said aperture and a second position wherein said opening lies to an opposite side of said aperture, means mounted on said shutter blade for movement therewith and having at least a part thereof movable responsively to said signals, and a diaphragm member mounted on said part for movement with said blade and for movement relative to said blade for cooperating with said opening responsively to said signals to alter exposure through said aperture proportionately to said signals.

4. An automatic exposure control mechanism for photographic devices comprising, in combination, housing means for defining an exposure aperture, photosensitive means for producing electrical signals in accordance with light incident thereon, and shutter means comprising a shutter blade having an aperture-covering portion, said portion having a slotted opening therein, said blade being mounted adjacent said aperture for pivotal movement between a stationary position wherein one extremity of said opening lies to one side of said aperture and a displaced position wherein the other extremity of said opening lies to an opposite side of said aperture, said opening overlying said aperture during a portion of said pivotal movement, means mounted on said blade for movement therewith and having at least a part thereof disposed at the pivotal axis of said blade and movable responsively to said signals, and a diaphragm member mounted on said part for movement with said blade and for movement relative to said blade for so varying the effective size of said slotted opening responsively to said signals as to alter exposure through said aperture proportionately to said signals.

5. An automatic exposure control mechanism for photographic devices comprising, in combination, housing means for defining an exposure aperture, photosensitve means for producing electrical signals in accordance with light incident thereon, and shutter means comprising a shutter blade having an aperture-covering portion, said portion having a slotted opening therein, said blade being mounted adjacent said aperture for pivotal movement between a stationary position wherein one extremity of said opening lies to one side of said aperture and a displaced position wherein the other extremity of said opening lies to an opposite side of said aperture, said opening overlying said aperture during a portion of said pivotal movement, a diaphragm member mounted on said blade at the pivotal axis of the latter for movement with said blade and for movement relative to said blade for varying the effective size of said slotted opening responsively to said signals to alter exposure through said aperture proportionately to said signals, and a movable cover means for occluding said aperture during movement of said blade from said stationary position to said displaced position.

6. An automatic exposure control mechanism as defined in claim 5 including means for moving said cover means to an aperture-uncovering position when said blade is in said displaced position, and means for retaining said cover means in said aperture-uncovering position during movement of said blade from said displaced position to said stationary position.

7. An automatic exposure control mechanism for photographic devices comprising, in combination, a housing having an exposure aperture therein, a photovoltaic cell mounted on said housing and having a photosensitive surface disposed generally perpendicularly to the optic axis of said aperture, said cell generating electrical signals in accordance with light intensities incident thereon, a shutter blade mounted on said housing adjacent and in covering relation to said aperture, said blade having an opening therein and being so movable that said opening may overlie said aperture for making exposures therethrough, motor means mounted on said blade for movement therewith and having a movable portion, a diaphragm member mounted on said portion for movement therewith and for movement relative to said blade for covering and uncovering portions of said opening, and means for so electrically coupling said movable portion with said photovoltaic cell that said movement of said diaphragm member relative to said blade is in response to said signals.

8. An automatic exposure control mechanism for photographic devices comprising, in combination, a housing having an exposure aperture therein, a photosensitive means disposed on said housing for reception of light from the field of view of said aperture and for generating electrical signals in accordance with said light, and shutter means comprising a movable shutter blade having an opening therein, said blade being movable between a first position wherein said opening lies to one side of said aperture and a second position wherein said opening lies to an opposite side of said aperture, means for moving said shutter blade from said first position to said second position, means for occluding said aperture during movement of said blade from said first position to said second position, means for so moving said blade from said second position to said first position that said opening overlies said aperture during an interval while so moving, a diaphragm member, means mounted on said blade for moving said diaphragm member relative to said blade, means for releasably retaining said diaphragm member for movement with said blade, and means for electrically coupling said photosensitive means with said means for moving said diaphragm member, said means for moving said diaphragm member being responsive to said electrical signals for proportionately moving said diaphragm member to vary the effective size of said opening in said blade.

9. An automatic exposure control mechanism for photographic devices comprising, in combination, housing means for defining an exposure aperture, photosensitive means mounted on said housing adjacent said aperture for generating electrical signals in accordance with light intensities of the field of view of said aperture, and shutter means comprising a movable shutter member pivotally mounted adjacent and in covering relation to said aperture, pivot means for mounting said shutter member, said shutter member having an opening therein and being movable about said pivot means between a stationary position wherein said opening lies to one side of said aperture and a displaced position wherein said opening lies to an opposite side of said aperture, means for moving said shutter member from said stationary position to said displaced position, means for occluding said aperture during movement of said shutter member from said stationary position to said displaced position, said opening exposing said aperture during a portion of movement of said member from said displaced position to said stationary position, a diaphragm means, means mounted on said blade for moving said diaphragm means relative to said opening to vary the effective area of said opening, latch means for releasably retaining said diaphragm means for movement with said member, means for releasing said diaphragm means from said latch means, and means for electrically coupling said photosensitive means with said means for moving said diaphragm means, said means for moving said diaphragm means being responsive to said electrical signals whereby the portion of said opening covered by said diaphragm means is varied in accordance with said light intensities.

10. In a shutter mechanism comprising photosensitive means for producing electrical signals in accordance with ambient light intensities, motor means responsive to passage therethrough of said electrical signals for controlling exposure setting of said mechanism, and means for actuating said mechanism to make an exposure, the combination with said mechanism of means coupled with said actuating means and being responsive to actuation of said mechanism for preventing said passage of said signals through said motor means.

11. An automatic exposure control mechanism for a photographic device having an exposure aperture, said mechanism comprising, in combination, a shutter blade for covering and uncovering said aperture, said blade having an opening therein and being mounted for movement in and out of a position wherein said opening overlies said aperture, means for moving said blade, photosensitive means for generating electrical signals in accordance with light incident thereon, means movable responsively to said signals and being mounted on said blade, diaphragm means for variably covering portions of said opening, said diaphragm means being mounted on said movable means for movement with said blade and for movement relative to said blade in accordance with said signals.

12. An automatic exposure control mechanism for photographic devices as defined in claim 11 including means for preventing said signals from reaching said means for moving said diaphragm means during movement of said shutter blade.

13. An automatic exposure control mechanism for photographic devices comprising, in combination, housing means for defining an exposure aperture, photosensitive means for producing electrical signals in accordance with light incident thereon, shutter means comprising a movable shutter blade, a diaphragm member, means mounted on said shutter blade for moving said diaphragm member and being electrically coupled with said photosensitive means, said diaphragm member being mounted on said means for moving said diaphragm member for movement with said shutter blade and for movement relative to said shutter blade for cooperating with said shutter blade to so define an opening whose magnitude is a function of said signals that movement of said blade and member moves said opening across said aperture to establish exposure, the time interval of which is a function of said magnitude.

14. An automatic exposure control mechanism as defined in claim 13 wherein said means for moving said diaphragm member comprises a galvanometer.

15. An automatic exposure control mechanism as defined in claim 14 including a switching means for preventing said signals from reaching said galvanometer during movement of said shutter blade.

16. An automatic exposure control mechanism as defined in claim 9 wherein said means for moving said diaphragm means relative to said shutter member comprises a galvanometer.

17. An automatic exposure control mechanism as defined in claim 16 wherein said mean for electrically coupling includes a switch means for uncoupling said photosensitive means from said galvanometer during movement of said shutter member.

18. An automatic exposure control mechanism as defined in claim 17 wherein said switch means comprises a portion of said latch means.

19. An automatic exposure control mechanism as defined in claim 8 wherein said means for electrically coupling includes a means for uncoupling said photosensitive means from said means for moving said diaphragm member during movement of said shutter blade.

20. An automatic exposure control mechanism as defined in claim 19 wherein said means for uncoupling comprises a portion of said means for releasably retaining said diaphragm member.

21. An automatic exposure control mechanism for photographic devices comprising, in combination, housing means for defining an exposure aperture, photosensitive means mounted on said housing adjacent said aperture for producing electrical signals in accordance with light intensities of the field of view of said aperture, and shutter means comprising a movable shutter blade pivotally mounted adjacent and normally in covering relation to said aperture, said shutter blade having an opening therein and being pivotably between a stationary position wherein said opening lies to one side of said aperture and a displaced position wherein said opening lies to an opposite side of said aperture, means for pivoting said shutter member from said stationary position to said displaced position, shutter blind means for covering said aperture during movement of said shutter blade from said stationary position to said displaced position, means for moving said shutter blade from said displaced position to said stationary position, means for retaining said shutter blind means for uncovering said aperture during movement of said shuter blade from said displaced position to said stationary position, said opening exposing said aperture during a portion of movement of said member from said displaced position to said stationary position, a diaphragm means mounted on said blade for movement with said shutter member and for movement relative to said shutter member for varying the effective area of said opening, latch means for releasably retaining said diaphragm means for movement with said shutter blade, means for releasing said diaphragm means from said latch means, galvanometer means for moving said diaphragm means relative to said shutter blade, means for electrically coupling said photosensitive means with said galvanometer means and including means for uncoupling said photosensitive means from said galvanometer means during movement of said shutter blade, said galvanometer means being so responsive to said electrical signals that the portion of said opening covered by said diaphragm means is varied in accordance with said light intensities.

22. An automatic exposure control mechanism for photographic devices comprising, in combination, housing means for defining an exposure aperture, photosensitive means mounted on said housing adjacent said aperture for producing electrical signals in accordance with light intensities of the field of view of said aperture, a shutter blade mounted adjacent and normally in covering relation to said aperture for rotation about a pivotal axis, said shutter blade having an opening therein and being rotatable in a plane about said axis between a first position wherein said opening lies to one side of said aperture and a second position wherein said opening lies to an opposite side of said aperture, means for moving said shutter blade from said first position to said second position, shutter blind means for covering said aperture during movement of said blade from said first position to said second position, means for moving said shutter blind means to be in an uncovering position with respect to said aperture when said shutter blade is in said second position, means for retaining said shutter blind means in said uncovering position, means for moving said shutter blade from said second position to said first position, said opening exposing said aperture during a portion of movement of said blade from said second position to said first position, galvanometer means mounted adjacent said pivotal axis of said blade for rotation in a plane substantially parallel to the plane of movement of said blade, a diaphragm means mounted on said galvanometer means for movement with said shutter blade and relative to said shutter blade for varying the effective area of said opening, latch means for releasably retaining said diaphragm means for movement with said blade, means for releasing said diaphragm means from said latch means, means for electrically coupling said photosensittve means with said galvanometer means, said galvanometer means being so responsive to said electrical signals that the effective area of said opening is varied in accordance with said light intensities, and means for uncoupling said photosensitive means and said galvanometer means during movement of said blade from said second position to said first position, the last-named means comprising a portion of said latch means.

23. An automatic exposure control mechanism for photographic devices comprising, in combination, a housing means for defining an exposure aperture, photosensitive means for producing electrical signals in accordance with light intensities, a movable shutter member for covering and uncovering said aperture, a movable diaphragm member, galvanometer means mounted on said shutter member and electrically coupled with said photosensitive means for moving said diaphragm member in accordance with said signals for varying the effective exposure area of said aperture, and means for uncoupling said galvanometer means from said photosensitive means during movement of said shutter member.

24. In a shutter mechanism comprising a galvanometer for controlling the operation of said mechanism in making exposures, means for electrically coupling said galvanometer with photosensitive means for producing electrical signals in accordance with light intensities, and means for actuating said mechanism to make an exposure, the combination with said mechanism of means coupled with said actuating means for uncoupling said galvanometer from said photosensitive means in response to actuation of said mechanism.

25. In a shuuter mechanism comprising a galvanometer for controlling the duration of exposure of said mechanism, means for so electrically coupling said galvanometer with a photocell that said galvanometer is movable responsively to the output of said photocell, and means for actuating said mechanism to make an exposure, the combination with said mechanism of means so soupled with said actuating means that said galvanometer is uncoupled from said photocell in response to actuation of said mechanism.

26. In a shutter mechanism comprising a galvanometer for controlling both exposure duration and the area of an exposure aperture of said mechanism, means for so electrically coupling said galvanometer with a photocell that said galvanometer is movable responsively to the output of said photocell, and means for actuating said mechanism to make an exposure, the combination with said mechanism of means so coupled with said actuating means as to uncouple said galvanometer from said photocell in response to actuation of said mechanism.

27. In a shutter mechanism comprising a galvanometer for controlling exposures effectuated by said mechanism, means for electrically coupling said galvanometer with a photosensitive means for producing electrical signals, means for actuating said mechanism to make an exposure, and means for retaining at least a portion of said galvanometer in a position predetermined responsively to said signals, the combination with said mechanism of means so coupled with said actuating means as to uncouple said galvanometer from said photosensitive means in response to actuation of said mechanism.

28. A combination as defined in claim 27 wherein said means for uncoupling comprises a portion of said means for retaining.

29. A combination as defined in claim 27 wherein said means for uncoupling and said means for retaining are actuated synchronously and responsively to actuation of said mechanism.

(References on following page)

References Cited in the file of this patent

UNITED STATES PATENTS

| | | |
|---|---|---|
| 438,943 | Perry | Oct. 21, 1890 |
| 1,312,289 | Wenderhold | Aug. 5, 1919 |
| 2,117,429 | Kuppenbender | May 17, 1938 |
| 2,163,737 | Prinsen | June 27, 1939 |
| 2,226,245 | Kende | Dec. 24, 1940 |
| 2,841,064 | Bagby | July 1, 1958 |
| 2,858,750 | Farinet | Nov. 4, 1958 |